(No Model.) 6 Sheets—Sheet 1.
I. A. KILMER.
BARB WIRE MACHINE.

No. 479,985. Patented Aug. 2, 1892.

Fig. 1.

Witnesses,
F. L. Durand
W. Schneider.

Inventor.
Irving A. Kilmer
per W. H. Singleton
atty.

(No Model.) 6 Sheets—Sheet 2.
I. A. KILMER.
BARB WIRE MACHINE.

No. 479,985. Patented Aug. 2, 1892.

Fig. 2.

Witnesses
J. L. Orraud
W. Schneider

Inventor
Irving A. Kilmer,
per W. H. Singleton,
Atty.

(No Model.) 6 Sheets—Sheet 4.

I. A. KILMER.
BARB WIRE MACHINE.

No. 479,985. Patented Aug. 2, 1892.

Witnesses,
F. L. Ourand.
W. Schneider.

Inventor,
Irving A. Kilmer,
per W. H. Singleton,
atty.

(No Model.) 6 Sheets—Sheet 6.

I. A. KILMER.
BARB WIRE MACHINE.

No. 479,985. Patented Aug. 2, 1892.

WITNESSES
F. L. Ourand.
W. Schneider.

INVENTOR
Irving A. Kilmer.
per W. H. Singleton.
Attorney

UNITED STATES PATENT OFFICE.

IRVING A. KILMER, OF NEWBURG, NEW YORK.

BARB-WIRE MACHINE.

SPECIFICATION forming part of Letters Patent No. 479,985, dated August 2, 1892.

Application filed February 29, 1892. Serial No. 423,320. (No model.)

*To all whom it may concern:*

Be it known that I, IRVING A. KILMER, a citizen of the United States, residing at Newburg, in the county of Orange and State of New York, have invented certain new and useful Improvements in Barb-Wire Machines; and I do hereby declare the following to be a full, clear, and exact description of the invention, such as will enable others skilled in the art to which it appertains to make and use the same.

The present invention relates to an improvement in barb-wire machines.

The object of the invention is to produce a machine which will do its work with a steady action and without any jerking or spasmodic pulling of the wire, which will pass the wire through with a uniform tension, and which will automatically regulate the passage of the wire so as to keep the machine at a predetermined speed and action.

The invention consists in a barb-wire machine containing, among others, the following salient features: first, a resilient retarding guide-wheel; second, a barb-pusher; third, a positive main-wire-slack take-up, and, fourth, an automatic brake.

Referring to the drawings.

Figure 6:
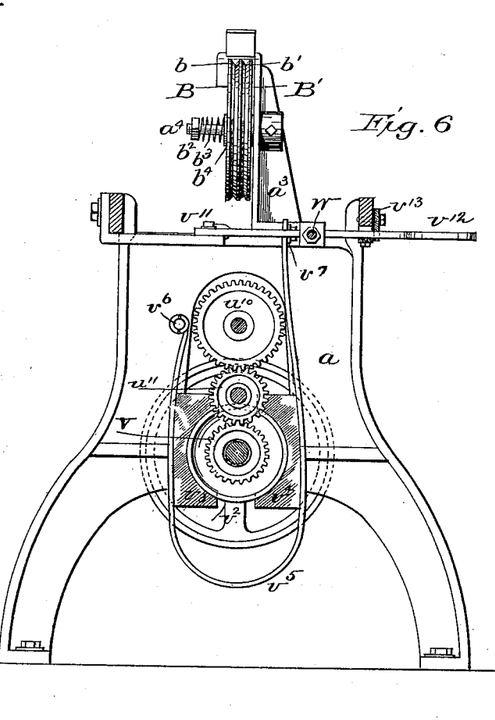
Fig. 6 is a vertical transverse section on line 6 6, Fig. 1, looking in the direction of the arrow.

In the drawings the letters $a$ $a'$ represent legs supporting a suitable frame A, forming together a stand for the operative parts. From the front end $a^2$ of the frame A there rises a standard $a^3$. In this standard $a^3$ is secured a stud $a^4$, which extends transversely over the frame A. On this stud are slipped the two guide-wheels B B', having the peripheral grooves $b$ $b'$. On the projecting end of the stud $a^4$ is a nut $b^2$. Between this nut and the wheel B there is placed on the stud a spiral spring $b^3$ and a plate $b^4$, the latter being held resiliently against the guide-wheel B by the spring $b^3$, Fig. 6. In front of these guide-wheels the standard $a^3$ carries the fixed guides $a^5$ $b^5$.

Figure 5:
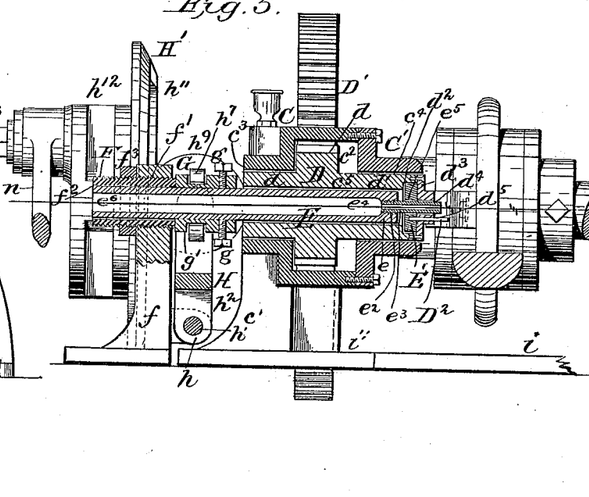
Fig. 5 is a vertical longitudinal section through the coiling-head and adjunctive parts.

To the top of the frame A and at a suitable distance from the guide-wheels B B' there is secured a bed-plate $a^6$. At the front end of this bed-plate $a^6$ is secured at the middle a plate $c$. Rising from this plate $c$ is a standard $c'$, carrying at its top a round box C, Fig. 5, having its concave $c^2$ toward the rear of the machine. This box C is to be closed by a cap C', the box C and the cap C' having the two tubular bearings $c^3$ $c^4$ along the middle longitudinal line of the machine and in line with the guide-wheels B B'. Within the box C is placed a gear-wheel D, having the teeth $d$, which project through a lateral opening in the box C and mesh with another wheel D', the location of which will be hereinafter set forth. The gear-wheel D has gudgeons $d$ $d'$, which bear in the bearings $c^3$ $c^4$, and through the wheel and its gudgeons there is a continuous central bore $c^5$. Within this bore $c^5$ is placed the tubular guide E, having its front end $e$, within the gudgeon $d'$, and to this end is secured the nipple $e^2$, which has a central passage $e^3$ communicating with the bore $e^4$ of the tubular guide E. Just beyond the extremity of the end $e$ of the tubular guide E the gudgeon $d'$ has the circular recess or seat $d^2$. In this seat there is placed a block E', through the central hole $e^5$ of which the nipple $e^2$ passes loosely. To this block E' is secured rigidly the coiling-pin $D^2$, which projects out beyond the end of the gudgeon $d'$. Secured to the outer end of this gudgeon $d'$ is a face-plate $d^3$, which has the central hole $d^4$, through which the nipple $e^2$ passes loosely, and another hole $d^5$, through which the coiling-pin $D^2$ passes.

Spaced from and in front of the standard $c'$ there rises another standard $f$, having therethrough the threaded orifice $f'$. This orifice $f'$ is along the middle longitudinal line of the machine and aligned with the bore of the gear-wheel D. Into this threaded orifice $f'$ is screwed a thimble F, having the central smooth bore $f^2$. Into this smooth central bore $f^2$ loosely fits the front end $e^6$ of the tubular guide E. On the outside of the thimble F and in front of the standard $f$ is screwed an adjusting-nut $f^3$. On the tubular guide E, between the two standards $c'$ and $f$, is placed a collar G, which is held by set-screws $g$ $g$, the collar being in line with the thimble F.

Figure 8:
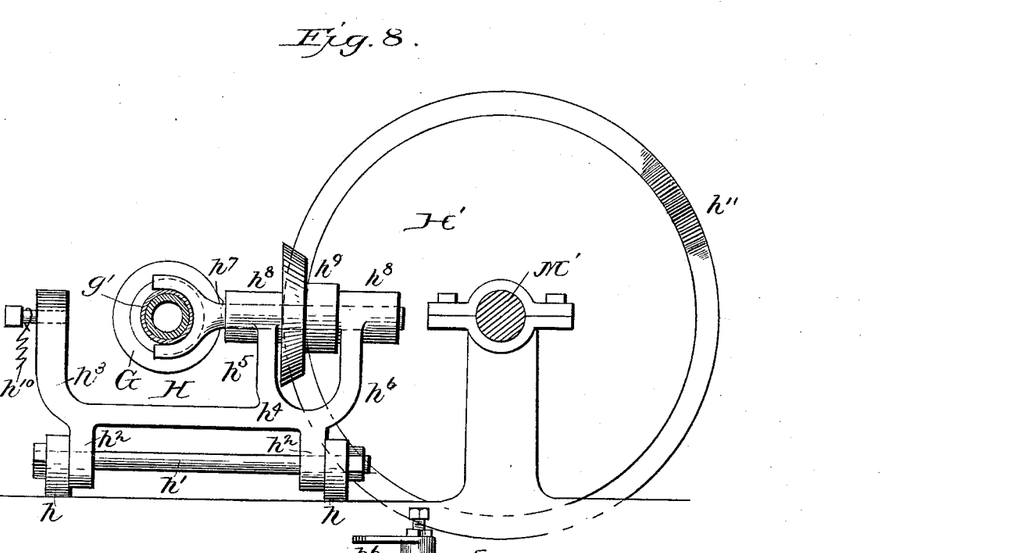
Fig. 8 is an enlarged view on line 8 8, Fig. 2, looking in the direction of the arrow.

On each side of the standard $f$ there is a lug $h$, to which lugs by a through-bolt $h'$, Fig. 8, there are pivoted the lugs $h^2$ of a yoke H, having the single arm $h^3$, coming up on one side of the collar G, and a double arm $h^4$, having the branches $h^5$ $h^6$, coming up on the other side of the collar G. From the upper end of the branch $h^5$ there extends inwardly a fork $h^7$, which fits loosely in a circumferential groove $g'$ in the collar G. In the branches $h^5$ $h^6$ are tubular bearings $h^8$, in which fit the arbors of a bevel-wheel $h^9$, this wheel coming between the two branches $h^5$ $h^6$. Placed so as to engage the bevel-wheel $h^9$ is a cam-wheel H', the construction and location of which will hereinafter be explained. To the single fork $h^3$ is secured one end of a spiral spring $h^{10}$, the other end of which is secured to the frame of the machine in front of the yoke H.

Figure 10:
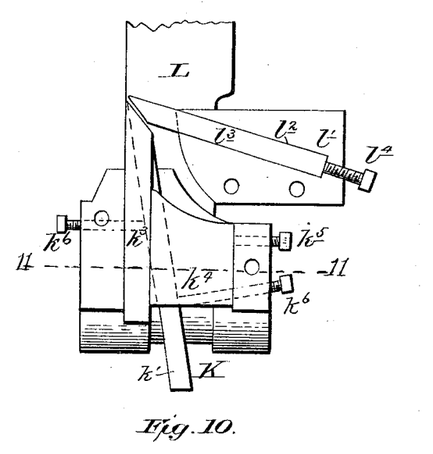
Fig. 10 represents a view, with the cap-plates removed, of the method of securing the fixed and movable knives.
Figure 11:
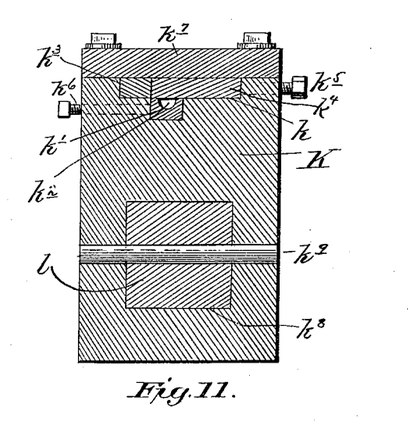
Fig. 11 is a section on line 11 11, Fig. 10.
Figure 12:
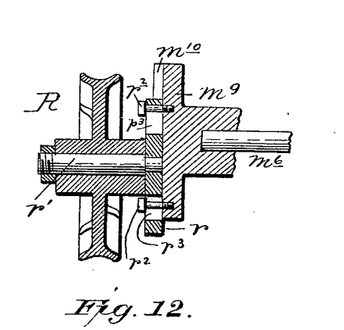
Fig. 12 is a detailed section of the rotative take-up for the barbed wire, taken on line 12 12, Fig. 2.

To the rear of the plate $c$ another plate $i$ is secured upon the plate $a^6$, the front edge $i'$ of the plate $i$ coming under the rear end of the bearing C. To one side of this bearing and behind the line of its rear end there is fastened to the plate $i$ the block K. This block has in its top the recess $k$, Figs. 10 and 11. In this recess, at the side nearer the bearing C, there are placed the oblique barbing-wire guide $k'$, which is a strip having the groove $k^2$ in its top, the stationary knife $k^3$, which rests in a groove of block K, and the follower $k^4$, which rests in the recess $k$ and bears against the knife. Against the rear edge of the follower $k^4$ is a screw $k^5$, which bears against the follower $k^4$, and two adjusting-screws $k^6$, which bear against the guide $k'$. A cover $k^7$ fits upon this block K. In the bottom the block K has a transverse recess $k^8$, in which is pivoted by a bolt $k^9$ and set-screw $k^{10}$ the tongue $l$ of the lever L, which projects out from the block and across to the other side of the machine. Projecting from the rear edge of this lever L is a plate $l'$, having the oblique groove $l^2$, in which is placed a knife $l^3$, against the rear end of which an adjusting-screw $l^4$ bears. A cover $l^5$ fits upon this plate $l'$ above the knife $l^3$. The upper surface of the plate $l'$ is slightly above that of the tongue $l$ of the lever L, and the edges of the plate $l'$ and its cover $l^5$ and those of the block K and its cover $k^7$, where they are opposite, are curved, as shown. The location of the two knives $k^3$ and $l^3$ is such that their cutting-edges come so near together as to sever the barbing-wire, as will be explained. On the lever L on the side of the bearing C away from the knives is the oblique barbing-wire guide $l^7$.

At the other end the lever L has the fork $l^6$, which fits into a groove $m$ in a cam-wheel M. This wheel M, as well as the wheels D' and H', are keyed to a shaft M', which runs lengthwise of the machine-frame at one side, as shown, the three wheels being spaced apart, so that each comes at its proper place in the machine to fit with its engaging part. The wheel H' has the cam-surface $h^{11}$ toward the bevel-wheel $h^9$. This wheel H' has the hub $h^{12}$ ribbed for lightness, and from this hub there is a stud $h^{13}$, to which is connected the pitman $n$, which extends across the machine below the nipple F and at its other end is connected to a rocker-arm N. This arm N has a hub $n'$, which fits loosely upon the end $o$ of a shaft O and is held thereon by a collar $n^2$. This arm N has a pawl $n^3$, and the shaft O has a fixed ratchet-wheel $o'$, by which pawl-and-ratchet connection the rocker-arm engages the shaft.

Figure 9:
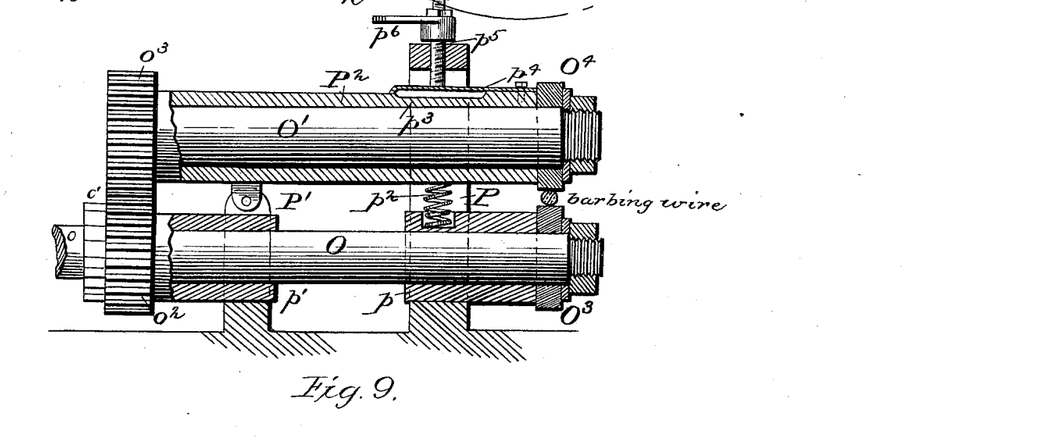
Fig. 9 is an enlarged section on line 9 9, Fig. 2.

Rising up from the side of the machine-frame are two posts P P', Fig. 9, the former higher than the other, and in both are the bearings $p$ $p'$ for the shaft O. To the top of the shorter post P' is hinged a tubular bearing P², which extends outwardly, and, passing through the top of the post P, terminates on a line with the bearing $p$. Between the bearings P² and $p$ is placed a spring $p^2$. In the top of the bearing P² at the post P is made a notch $p^3$, in which fits the end of a spring $p^4$, secured to the bearing. On this spring $p^4$ bears the lower end of the screw $p^5$, which is held in the top of the post P and has a handle $p^6$.

In the bearing P² is a shaft O', the two shafts O and O' having the intermeshing gear-wheels $o^2$ $o^3$. On the projecting ends of the shafts O O' are placed the barbing-wire-feed wheels O³ O⁴. Secured to the frame in front of these wheels is the barbing-wire guide $o^4$, and between these wheels and the guide $k'$ in the block K there is an oblique guide $o^5$.

Extending out from the rear end of the machine-frame is a bracket Q, from which rises a standard $q$, having the bearing $q'$, in which turns the shaft M'. Beyond this bearing this shaft M' has on its end the bevel gear-wheel $m'$, which engages another bevel gear-wheel $m^2$ upon a cross-shaft $m^3$, which turns in bearings $q^2$ $q^3$ of the forks $q^4$ $q^5$, extending out from the standard $q$. Just within the bearing $q^2$ the shaft $m^3$ has a gear-wheel $m^4$, which meshes with another gear-wheel $m^5$ below it and on a shaft $m^6$, which runs parallel to the shaft $m^3$ and turns in bearings $m^7$ $m^8$ in the forks $q^4$ $q^5$ below the bearings $q^2$ $q^3$. Outside of the bearing $m^8$ the shaft $m^6$ has on its end a disk $m^9$, in the outer surface of which there is a diametric groove $m^{10}$. Fitting into this groove $m^{10}$ is a slide $r$, carrying the crank-pin $r'$. This slide is held to the disk $m^9$ by screws $r^2$, which pass through the slots $r^3$ in said slide $r$. On the crank-pin $r'$ is a wheel R, having a peripheral groove or provided with wings, as shown. The position of this wheel R is such that it is in line, substantially, with the bore of the box C and the nipple $e^2$, the said wheel R being off the center of the disk $m^9$.

Figure 1:
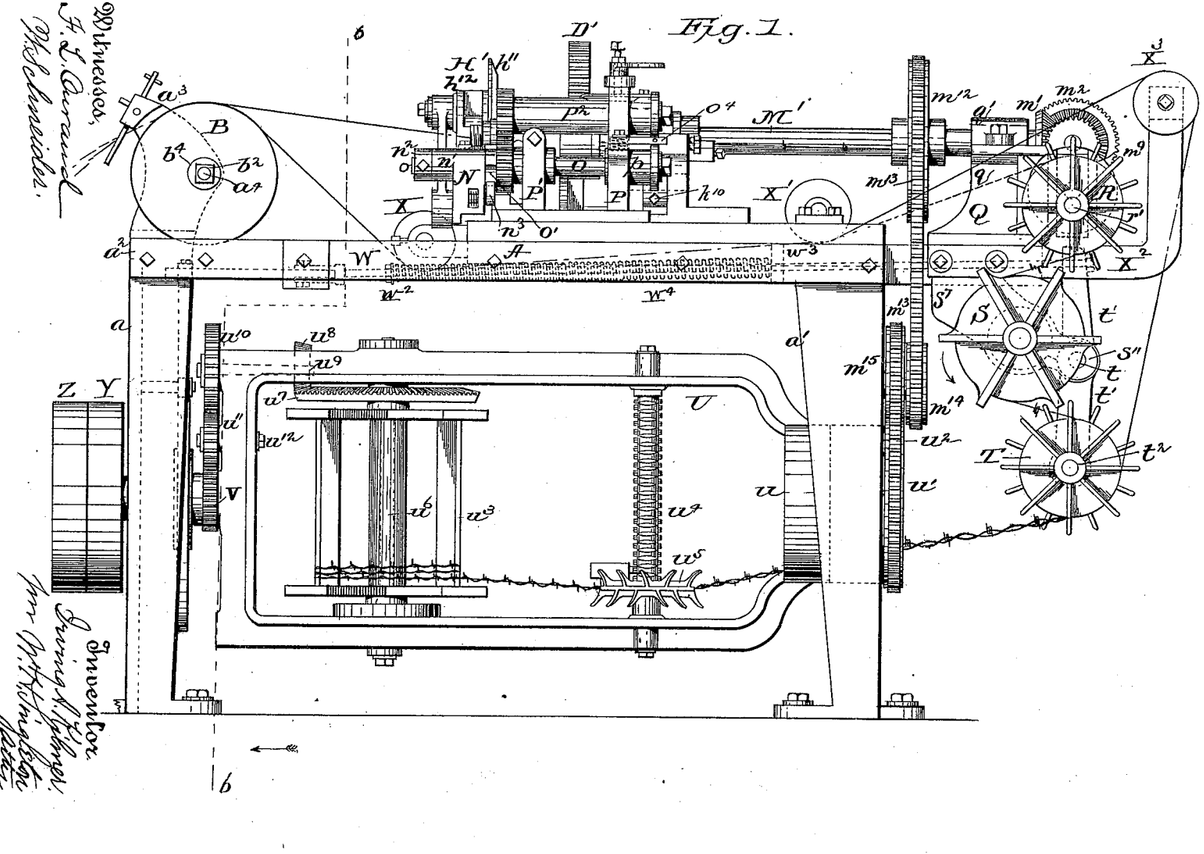
Figure 1 represents a side view of the machine, the twister and reeler being shown in a vertical position.
Figure 2:
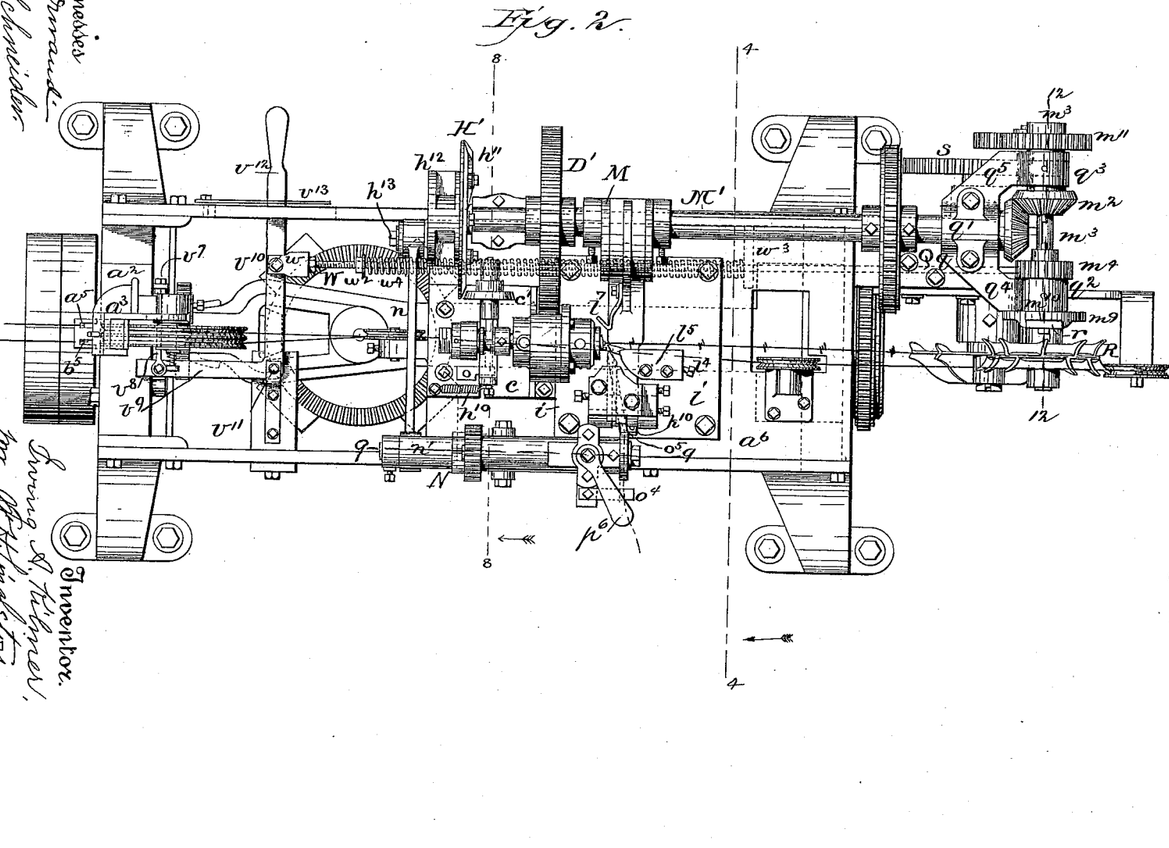
Fig. 2 represents a top or plan view of the machine.
Figure 3:
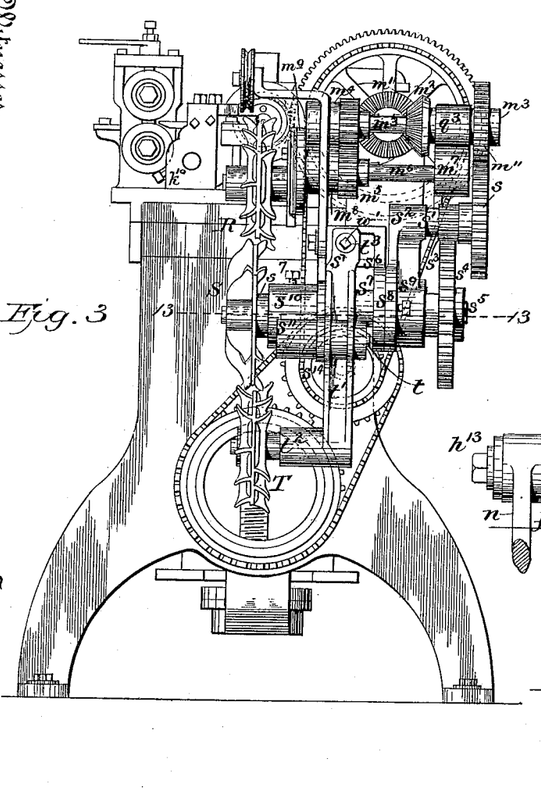
Fig. 3 represents an end view of the rear of the machine.
Figure 4:
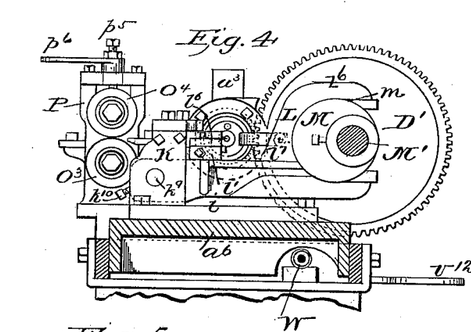
Fig. 4 is a vertical cross-section on the line 4 4, Fig. 2, looking in the direction of the arrow and showing parts beyond in elevation.
Figure 13:
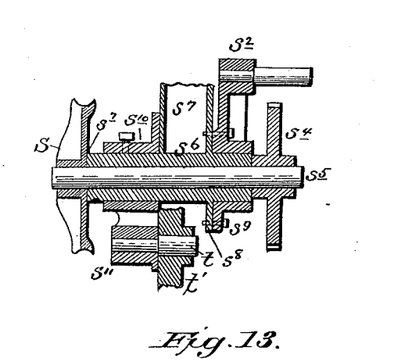
Fig. 13 is a section on line 13 13, Fig. 3.

Outside of the bearing $q^3$ the shaft $m^3$ has on its end a gear-wheel $m^{11}$, Fig. 3, which meshes with a gear-wheel $s$ upon a stud $s'$, which turns in a bearing $s^2$. This stud $s'$ has upon it inside of the wheel $s$ a pinion $s^3$, which engages a gear-wheel $s^4$ upon a shaft $s^5$, which runs across the machine and turns in bearings $s^6$ $s^7$, depending from the bracket Q. The bearing $s^6$ $s^7$ is secured to the under side of the bracket Q of the machine by the arm $s^7$. The bearing $s^2$ is secured to the bearing $s^6$, as shown in Figs. 3 and 13, the two flanges $s^8$ $s^9$ being bolted together. The bearing $s^6$ is a long tube, which extends out so that its outer end is below the wheel R. Beyond the end of the bearing $s^6$ the shaft $s^5$ protrudes and has secured upon it a wheel S, which is similar in construction to the wheel R, though somewhat larger, and the two wheels have the same plane of rotation. Surrounding the bearing $s^6$, at the side of the wheel S, is a sleeve $s^{10}$, from which depends an arm having the bearing $s^{11}$. In this bearing is a bolt or shaft $t$, on which is hinged a rocker-arm $t'$. At the bottom this arm $t'$ has the stud $t^2$, extending out and carrying the loose wheel T, which has the same plane of rotation as that of the wheels R and S.

Figure 7:
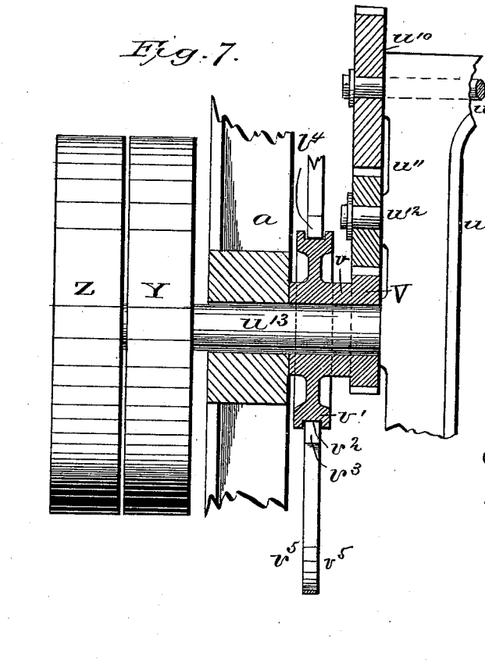
Fig. 7 is an enlarged detail view, partly in elevation and partly in section, of the mechanism attached to the twister for driving the reel, and the sectional part is taken vertically through the middle of the parts as arranged in Fig. 6.

Secured upon the shaft M', inside of the standard $q'$, is a sprocket-wheel $m^{12}$, from which runs a sprocket-chain $m^{13}$ to another sprocket-wheel $m^{14}$ on a stud, on which there is another sprocket-wheel $m^{15}$. In the leg $a'$ is made a circular hole or bearing, in which loosely fits the barrel $u$ of the reeling and twister frame U. This barrel has on the outside a sprocket-wheel $u'$, from which a sprocket-chain $u^2$ runs to the sprocket-wheel $m^{15}$. In this reeling and twister frame U is placed the reel $u^3$ and the right-and-left-hand screw $u^4$ and traveling guide-wheel $u^5$. The shaft $u^6$ of the reel $u^3$ has the bevel gear-wheel $u^7$, which meshes with the bevel-pinion $u^8$ on the shaft $u^9$, which is boxed in the frame U and carries outside at the front end of this frame U the gear-wheel $u^{10}$. This gear-wheel $u^{10}$ engages another gear-wheel $u^{11}$ on a stud $u^{12}$, and this in turn another gear-wheel V. This gear-wheel V is loose upon the stud $u^{13}$, Figs. 6 and 7, which projects from the frame U. The gear-wheel V has a projecting hub $v$, provided with a circular flange $v'$, having the peripheral groove $v^2$. Fitting into this groove $v^2$, one on each side, are the brake-shoes $v^3$ $v^4$. These shoes $v^3$ $v^4$ are held in place within this groove $v^2$ by the elastic strap $v^5$, Fig. 6, which is pivoted at $v^6$, curves down around the under side of the wheel V, bears against the outer edges of the brake-shoes, and at its free end $v^7$ is secured to a rod $v^8$. The other end of this rod $v^8$ is pivoted to one arm $v^9$ of the bell-crank brake-lever $v^{10}$, which is pivoted to the machine-frame at $v^{11}$ and has the handle $v^{12}$ projecting to one side thereof. Pivoted to this handle $v^{12}$ is one end $w$ of a rod W, which passes along the machine-frame and has its other end $w'$ secured in the upper end $t^3$ of the rocker-arm $t'$. On this rod W, near the brake-lever $v^{10}$, is placed a nut $w^2$, and depending from the plate $a^6$ of the machine-frame is a lug $w^3$, through which the rod W loosely passes. Around this rod W and between the nut $w^2$ and the lug $w^3$ is a spiral spring $w^4$.

Two loose pulleys X and X' are secured to the top of the machine-frame in front and rear of the plates $c$ and $i$, there being openings in said frame at these pulleys. From the standard Q an arm $X^2$ may project outwardly and upwardly and carry a loose pulley $X^3$.

The stud $u^{13}$ of the reeling and twister frame U has its bearing in the leg $a$ and has the usual fast and loose pulleys Y and Z, by which power is applied to the machine.

The operation of the machine is as follows: The main wire to be barbed is fed through the fixed guide $a^5$ and over the guide-wheel B' in the groove $b'$, and the binding-wire is fed through the fixed guide $b^5$ and over the guide-wheel B in the groove $b$. Thence the wire to be barbed (and which henceforth will be styled the "main wire" and the other the "binder-wire") passes through the bore $e^4$ of the tubular guide E and out through the bore $e^3$ of the nipple $e^2$. Thence it passes around the wheel R, thence around the wheels S and T over the guide-wheel $u^5$ and to the reel $u^3$. The binder-wire passes under the pulleys X X', thence to the pulley $X^3$, and thence to the pulley T, where it joins the main wire; or from the pulley X' the binder-wire may join the main wire at the wheel R and go thence with the main wire to the reel and twister. The barbing-wire is fed through the guide $o^4$, between the feed-wheels $O^3$ $O^4$, these being operated, as will be explained, along the oblique guide $o^5$, and through the guide $k'$ in the block K under the stationary knife $k^3$ and over the end of the movable knife $l^3$ and under the main wire, the oblique guide $l^7$ guiding the end close to the coiling-head and under the coiling-pin $D^2$. When the three wires are in this position, power is applied at the fast pulley Y, and as the reeling and twisting frame U is thus operated through the sprocket-chains $u^2$ and $m^{13}$ the shaft M' is revolved. This causes the wheel D' to operate upon the wheel D, turning it. As the wheel D turns, its face-plate $d^3$, carrying the coiling-pin $D^2$, also turns, and the latter, engaging the barbing-wire, carries it the desired number of twists about the main wire, the wheel D and its connective parts being thus a coiling-head. The tubular guide E and its nipple $e^2$, being loose in the wheel D, may or may not turn with it, this looseness preventing any pull or twist on the main wire. The collar G, being loose in the fork $h^7$, can turn with the tubular guide E, and its throw is regulated by the nipple F. The various parts are so timed that as soon as the coiling-pin $D^2$ has completed the due number of turns around the main wire the cam-wheel M moves the lever L upward and the end of the barbing-wire is severed between the movable knife $l^3$ and the stationary knife $k^3$. As this takes place the cam $h^{11}$ of the wheel H′, coming in contact with the bevel-wheel $h^9$, swings the yoke H on its pivot-bolt $h'$, the bevel-wheel reducing the friction. As the yoke H swings, the fork $h^7$ moves the collar G and the tubular guide E and its nipple $e^2$ outward. The outer end of the nipple, coming in contact with the barb, pushes the latter along the main wire and out of contact with the coiling-pin, thus avoiding any catching while the main wire is being pulled forward. As the cam-wheel H′ rotates, the pitman $n$ communicates motion to the rocker-arm N. The pawl $n^3$ of this rocker-arm N, engaging the ratchet $o'$ on the shaft O, causes the latter to rotate. By the engaging wheels $o^2 o^3$ the other shaft O′ is also rotated. The barbing-wire fed through the guide $o^4$ is caught by the wheels $O^3 O^4$ and fed to the coiling-head. The spring $p^2$ permits a yielding of the bearing $P^2$ upon the bearing $p$, allowing for difference in size of the barbing-wire. By the screw $p^5$ and spring $p^4$, with the spring $p^2$, the two bearings are kept in an elastic relation to each other. As soon as the barb is formed and pushed away from the coiling-pin the shaft M′, through the wheels $m' m^2$, shaft $m^3$, wheels $m^4 m^5$, and shaft $m^6$, having turned the disk $m^9$ so that the crank-pin $r'$ has brought the wheel R to its farthest position inward or to the inner extremity of its throw, the said crank-pin $r'$ carries the wheel R outward, pulling with it the main wire, barbed, and continues so to do until the said wheel R reaches its farthest position outward, or the outer extremity of its throw. When the wheel R reaches the latter position and starts upon its inner return, the the slack in the main wire, which would otherwise occur, is taken up by the reel $u^3$ pulling the main wire, as will be explained. During the inner return of the wheel R the main wire is stationary at the coiling-pin $D^2$ and another barb is formed. This operation of the wheel R is continued. It will be noticed that the action of this wheel R is given it by the disk $m^9$ and the crank-pin $r'$, the rotation of the wheel R on the pin $r'$ being to reduce friction. As the barbed wire is pulled by the reel $u^3$ with a speed and tension due to the revolution of said reel, controlled as will be explained, the main wire bears with a steady force against the wheel R in the latter's entire rotation. As the reel $u^3$ pulls the main wire from the coiling-head and around the wheels R, S, and T the wheel R moves, as described, and the wheel T moves loosely on the stud $t^2$. The wheel S is driven from the shaft M′ through the wheels $m' m^2$, shaft $m^3$, wheels $m^{11} s$, stud $s'$, pinion $s^3$, wheel $s^4$, and shaft $s^5$. This wheel S is driven in the same direction as that in which the main wire is pulled by the reel $u^3$. The binder-wire, with the main wire, passes through the hollow barrel $u$ and is twisted and then reeled upon the reel $u^3$. The frame U is revolved, and as it turns the reel is also turned and the wheel $u^5$ travels along the screw $u^4$. This causes the main and binder wire to be twisted and wound together around the reel $u^3$. This reel is turned through the mechanism V, $u^{11}$, $u^{10}$, $u^9$, $u^8$, and $u^7$. As the wheel V, though loose upon the stud $u^{13}$, engages the wheel $u^{11}$ this would cause the two wheels thus engaged to move together with the frame U and not to turn on each other; but the brake-shoes $v^3 v^4$, bearing on the flange $v'$, tend to retain the wheel V, allowing the stud $u^{13}$ to turn in the latter, whereby, the wheel $u^{11}$ turning about the wheel V, the reel $u^3$ is revolved. By means of the lever $v^{10}$ the pressure of the brake-shoes $v^3 v^4$ may be varied, so as to vary the speed of the reel $u^3$. When the reel starts, the coil being at its smallest size, less force is required to turn the reel. Hence there is less pressure of the brake-shoes $v^3 v^4$ to retain the wheel V. The action of the spring $w^4$ to set the brake-shoes is resisted by the pull upon the rod W through the rocker-arm $t'$, the wires exerting a force upon the wheel $t^2$ and pulling it inward. As the coil increases in size the force of this pull tends to diminish, and as this occurs the spring $w^4$ exerts its pressure upon the brake-lever $v^{10}$, and compresses the brake-shoes $v^3 v^4$ against the flange $v'$, thus increasing the force applied to the reel $u^3$. When it is desired to renew a coil and put in a new reel, the handle $v^{12}$ of the lever $v^{10}$ is caught by the catch $v^{13}$ thereat, and the reel, being loosened, may be moved by hand. In a machine such as described the reel $u^3$ as it revolves pulls the main wire and the binder-wire through the machine, the rotation of the wheel R allowing for enough slack for the main wire to stop long enough for the barb to be formed without checking the action of the reel and twister. The guide-wheels B B′, being pressed by the spring $b^3$, have a tendency to retard the pull of the two wires, and hence the latter pass firmly and evenly to the machine and with a steady feed. The tubular guide E being loose in the wheel D, any twist or binding of the main wire is avoided, and as the nipple $e^2$ pushes the barb away from the coiling-pin there is no danger of the barb catching on the pin, as the reel $u^3$ pulls the wire forward. As the wheel R and the main wire are always in close contact, there is no jerking action, but they move together smoothly. The wheel R also can be adjusted in toward or out from the center of the disk $m^9$. As the wheel S is driven positively in the same direction with the traverse of the main wire as it is pulled by the reel $u^3$, this wheel S acts as a friction-brake upon the traverse of the wire. Should the reel $u^3$ tend to pull the wire faster than the wheel S is turning, the difference in speed would have a retarding effect upon the traverse of the wire, and this retarding effect causes the wire to pull upon the pulley T, operating the brake, as described.

Having thus described my invention, what I claim is—

1. In a barb-wire machine, the combination of a reel at one end of the traverse of the main wire, a guide-wheel at the other end of such traverse, devices for placing barbs upon the main wire, located between such reel and guide-wheel, and means, such as described, for binding the guide-wheel resiliently against the main wire, whereby such main wire is kept at uniform tension and with a steady feed, as set forth.

2. In a barb-wire machine, the combination of a coiling-head provided with a coiling-pin and a passage for the wire to be barbed, of a barbing mechanism and a barb-pusher whereby when the barb is formed it is pushed along the line-wire out of the way of the coiling-pin, as set forth.

3. The coiling-head provided with the coiling-pin and the tubular guide provided with the tubular nipple or barb-pusher $e^2$, which projects from the coiling-head, as set forth.

4. The tubular guide and its tubular nipple or barb-pusher $e^2$, in combination with the collar G, the yoke H, and means, substantially as set forth, for operating said yoke.

5. The combination of the tubular guide E and its nipple or barb-pusher $e^2$ with the collar G, the yoke H, the fork $h^7$ of which yoke clasps the collar G, the bevel-wheel $h^9$, held by the yoke H, and the cam-wheel H', as set forth.

6. The combination of the tubular guide E and its tubular nipple $e^2$ with the collar G, having the groove $g'$, the pivoted yoke H, having the fork $h^7$, which clasps the collar G in the groove $g'$, and the double arm $h^4$, the bevel-wheel $h^9$ in such double arm $h^4$, the cam-wheel H', and the spring $h^{10}$, as set forth.

7. In a barb-wire machine, the combination of the tubular wire-guide E, the collar G, surrounding such guide, the standard $f$, placed in front of such guide and collar, and the adjustable thimble F, secured in such standard in line with the guide E, such guide having its front end $e^6$ fitting loosely in such thimble, as set forth.

8. The combination of the box C and the wheel D therein and provided with the recess $d^2$ and face-plate $d^3$ with the block $e^5$ and the coiling-pin $D^2$, projecting from the said block through the face-plate, the tubular guide E, and the nipple or barb-pusher $e^2$, which latter projects through the block $e^5$ and the face-plate $d^3$, as set forth.

9. The combination of the box C and the wheel D therein, provided with the face-plate $d^3$, with the tubular guide E, with the wheel D, and the nipple or barb-pusher $e^2$, projecting from said wheel, as set forth.

10. The combination of the block K, having the knife $k^3$, and the lever L, pivoted thereon, carrying the knife $l^3$ and having the forked end $l^6$, with the cam-wheel M and the shaft M', as set forth.

11. In a barb-wire machine, the main-wire take-up, which consists of a continuously-driven rotating shaft provided with a crank-pin provided with a loosely-turning wheel, on which the wire bears during the entire rotation of the shaft, as set forth.

12. In a barb-wire machine, the combination of the mechanism for placing the barb upon the main wire and the mechanism for drawing forward such line-wire after it is barbed with a main-wire take-up interposed between the same, which consists in a shaft provided with a crank-pin at one end, on which the pressure of the main wire is taken during the entire rotation of the shaft, as set forth.

13. The combination of the disk $m^9$, having the pin $r'$, the wheel R, loose on said pin, the shaft $m^6$, carrying said disk, the shaft M', and intermediate gearing between the two shafts, as set forth.

14. In a barb-wire machine, the combination of the reel, its operative mechanism, and a brake therefor with a wheel over which the main wire passes to the reel and intermediate mechanism between such wheel and brake, whereby such brake is automatically affected by the traverse of the wire over the wheel, as set forth.

15. The combination of the reel $u^3$, the reel and twister frame supporting the same, the wheel V upon the stud of said frame, the intermediate gearing between the reel and the wheel V, a brake for said wheel V, a wheel over which the main wire passes to the reel, and intermediate mechanism between such wheel and brake, whereby such brake is automatically affected by the traverse of the wire over the wheel, as set forth.

16. The combination of the reel $u^3$ and the train of mechanism for operating the same, one member of which is provided with a brake, with the loose wheel T and its supporting-arm $t'$, the last connected with said brake, as set forth.

17. The combination of the reel $u^3$ and its operating mechanism, one member of which is provided with a brake having the lever $v^{10}$, with the wheel T, its supporting-arm $t'$, the rod W, connecting the said arm with the said handle, the nut $w^2$ on the rod, the lug $w^3$ on the machine-frame, and the spring $w^4$ on the rod W and bearing between the lug-nut $w^2$ and the lug $w^3$, as set forth.

18. The combination of the reel $u^3$ and its operating mechanism, one member of which is provided with a brake, with the wheel T and its supporting-arm $t'$, connected with such brake, the positively-driven wheel S, and the main-wire take-up R, as set forth.

In testimony whereof I affix my signature in presence of two witnesses.

IRVING A. KILMER.

Witnesses:
E. D. FULLER,
JOHN H. BANCROFT